D. J. KELLY.
FILTERING APPARATUS.
APPLICATION FILED MAR. 3, 1910. RENEWED JAN. 3, 1912.
1,024,082.
Patented Apr. 23, 1912.
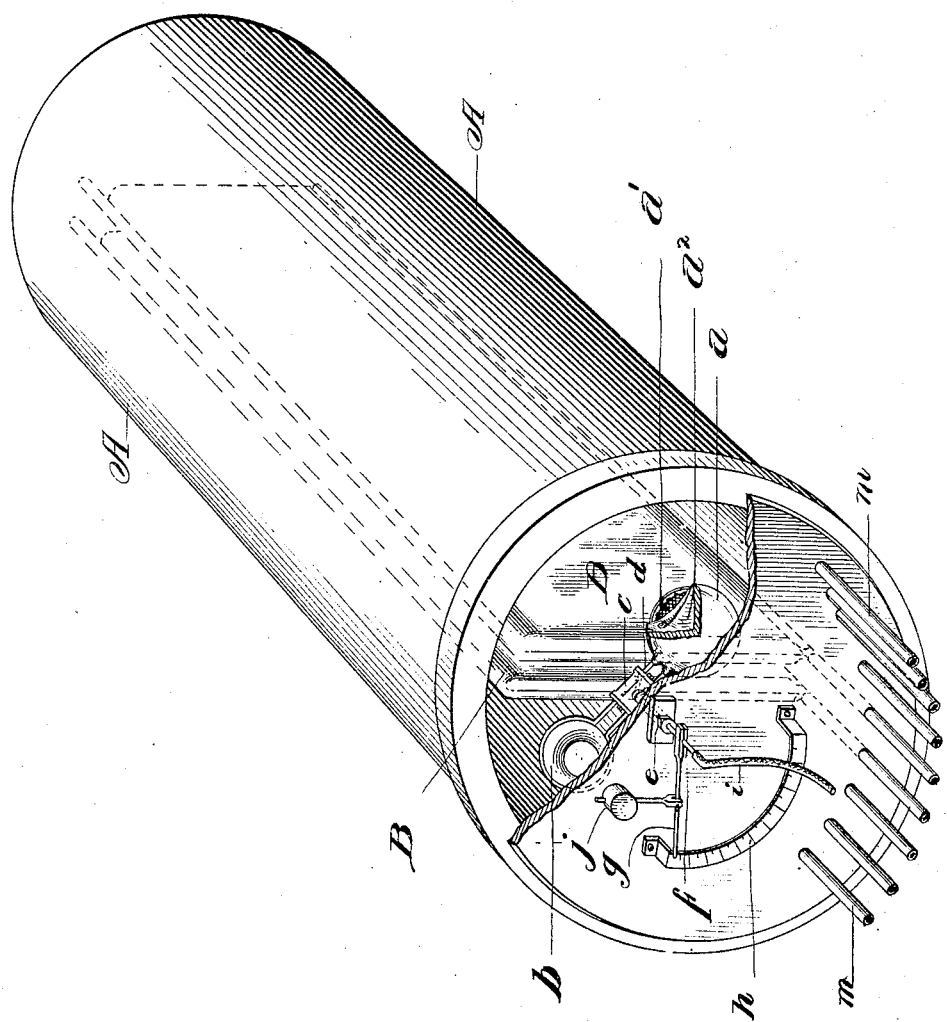
Witnesses
G. H. Golson
E. G. Gibbs
Inventor
David J. Kelly
By T. Walter Fowler
Attorney

UNITED STATES PATENT OFFICE.

DAVID J. KELLY, OF SALT LAKE CITY, UTAH, ASSIGNOR TO KELLY FILTER PRESS COMPANY, OF SALT LAKE CITY, UTAH, A CORPORATION.

FILTERING APPARATUS.

1,024,082. Specification of Letters Patent. Patented Apr. 23, 1912.

Application filed March 3, 1910, Serial No. 547,029. Renewed January 3, 1912. Serial No. 669,237.

*To all whom it may concern:*

Be it known that I, DAVID J. KELLY, a citizen of the United States, residing at Salt Lake City, in the county of Salt Lake and State of Utah, have invented certain new and useful Improvements in Filtering Apparatus, (Case B,) of which the following is a specification.

This invention relates to an apparatus designed to separate one material from another as slimes from which precious metals have been dissolved and the liquid which holds the precious metals in solution.

While the invention is especially useful in the filtration of slimes from which the metal contents have been dissolved, as in the cyanid treatment of ores, I do not limit the present improvements to such type of apparatus for it is quite evident that they will be found useful in the filtration of sugar juice and saccharates, as also in many other fields where a separation of solids from liquids is to be effected.

For present purposes, I will assume that the invention is to be used in connection with a filtering apparatus of substantially the form shown in my prior Patent No. 815,021, dated Mar. 13/06, and 864,308, dated Aug. 27/07, said invention being in the nature of an addition to the filtering tanks of said patents and being designed to automatically indicate the point to which filtration should proceed; in other words, to indicate the cake thickness on the filter frames, or the medium upon which the solid material is collected.

With the above and other objects in view my invention consists of the parts, and the constructions, arrangements and combinations of parts, which I will hereinafter describe and claim.

In the accompanying drawing forming a part of this specification, the figure represents a perspective view of a filter tank of the closed type with a portion of one head thereof broken away to expose the interior position and operation of the present improvements.

The filter tank, A, may be of any appropriate construction and may represent any tank or casing within which filtration is designed to take place. It is preferably a closed tank having end heads, one of which may be removable, as fully described and claimed in my aforesaid patents. Within the tank will be suitably positioned the filter frames, B, covered with some appropriate fibrous material or otherwise fashioned to permit the passage of liquid while retaining the more solid matter upon the outer surfaces. For present purposes, it may be assumed that the filter frames are assembled and have the general construction of the like frames shown and described in my former patents, but as these frames, as well as the construction of the tank, form no part of the present invention, such parts are not shown in detail and a more extended reference to them does not seem to be necessary.

The present improvements are designed to provide an attachment or means for automatically indicating the point to which filtration should proceed, or in other words to impart a visual indication to an operator of the cake thickness on the filter medium within the tank. That this object may be attained, I locate within one end of the tank, or some other portion of said tank if desired, a small filter, $a$, which may be of the pressure filter type and may have any suitable construction, for instance it may be a hollow frame with a foraminous plate, $a'$, or sheet over which a fibrous material, $a^2$, is placed and properly secured, said filter having its interior connected with a suitable hollow arm which is represented by the pipes, $d$, connecting with passages is a suitable head, $c$, and which head has projecting radially from its opposite side a float, $b$, of any suitable character. In other words, the filter and the float are at opposite ends of a pivoted connection, and which connection is carried by a pipe, $f$, which serves as a pivot about which the float and filter may oscillate, said pipe passing through an appropriate stuffing box, $e$, or other leak-tight joint fixed in the head or some other portion of the filter tank, A. To the outer portion of this pivot pipe, $f$, is fixed an arm or pointer, $g$, and upon this arm is mounted the adjustable weight, $j$. On the outer portion of the tank is secured a graduated plate or quadrant, $h$, over which operates the outer or free end of the arm or pointer, $g$. The pivot pipe, $f$, may be connected to a flexible tubing, $i$, or other extension by means of which the filtered liquid may be conducted to any suitable point; the filter frames will also be provided with outwardly extending pipes which form outlets for the filtered liquid, as shown at m, and as more fully described in my aforesaid patents.

From this description it will be apparent that the filter, a, and the float, b, are mounted inside the slimes filter tank and are affixed to the pivot pipe, said filter and float being upon opposite sides of the pipe as shown whereby any movement of the filter and float will be communicated directly to the pipe, f, and as the pointer is fixed to this pipe it is quite evident that the free end of the pointer will be caused to travel over the graduations on the quadrant or plate, h, to thereby indicate the thickness of the accumulated solid material, which has become caked on the filter.

It will be understood that the slimes pulp is introduced into the tank, A, in some appropriate manner and that as the tank fills, as described in my aforesaid patent, the filter, a, becomes submerged as do the filter frames or the main filters in the tank. As pressure is applied to the fluid contents of the tank and filtration proceeds, a cake forms on the filter, a, in the same proportion as on the main filters, and as this cake increases in bulk or thickness, its weight causes the filter to gradually swing downwardly about the pipe, f, as an axis and thereby cause the pointer or arm, g, to swing upwardly in the same proportion as the filter swings downwardly inside the tank. In this manner a cake of definite thickness is automatically indicated as thickness is in direct proportion to the weight.

It is obvious that the weight of the caked material on the filter will vary as the density of the material to be filtered, in which the cake is submerged, varies; that is, a mixture of high specific gravity has a greater buoyant effect than one of less specific gravity and hence a submerged cake weighs less in the denser medium and more in a lighter medium. The float, b, is under the same conditions of submergence as the caked material on the filter, a, and, therefore, as the float is movable in an opposite direction to the filter, it acts as a compensating balance for the latter. In this manner the pointer will indicate the same end-point irrespective of the density or proportion of solids to liquids in the mixture to be filtered. The float is also so proportioned that the effect of the force of buoyancy on the cake is neutralized, and as buoyancy is proportional to the weight of displaced liquids the size of the float is made to correspond relatively to the cubical contents of the desired cake and the distance from the fulcrum. Ordinarily the weight of the float is designed to indicate zero in water. In a denser medium the buoyant effect becomes manifest and is indicated by the pointer, g, on the exterior graduated quadrant. The specific gravity of a slimes mixture can, therefore, be read off on the indicator before the cake begins to build on the filter, a.

While the invention is described in connection with a pressure filtering apparatus, it will be understood that it is not limited in its use to such apparatus for it can be applied to all other types of hollow filters with but slight modification in the method of connecting the present attachment to said filters. In other words, to convert the pressure shown into a suction filter, it is only necessary to attach the flexible connection, i, to a suitable branch from a suction line communicating with the main filter frame, as will be readily understood by one skilled in this art.

Having thus described my inventio. what I claim as new and desire to obtain by Letters Patent is:—

1. The combination with a filter tank, of a supplemental filter within the same and upon which the solid material accumulates, means connecting with said supplemental filter and operating in the contents of the tank and serving as a compensating balance for said filter, and a visual means for indicating the cake thickness on the supplemental filter.

2. The combination with a filter tank having a main filter upon which the solid material accumulates, of a supplemental filter within the tank and upon which the solid material also accumulates, a buoyant member connecting with the supplemental filter and operating in the contents of the tank and serving as a compensating balance for the supplemental filter, and a visual indicator on the outside of the tank operated by the supplemental filter and buoyant member for disclosing the thickness of the caked material on said supplemental filter.

3. The combination with a tank having a main filter upon which the solid material accumulates, of a supplemental filter within the tank and upon which the solid material also accumulates, a float connected to move in unison with the supplemental filter, and a visual indicator on the outside of the tank operated by the rise and fall of the filter and float within the contents of the tank and for indicating the cake thickness on the filters.

4. The combination with a tank having a main filter upon which the solid material accumulates, of a supplemental filter within the tank and submerged therein and upon which the solid material also accumulates, a float connected to move in unison with the supplemental filter, a pipe to which the supplemental filter and float are connected, said pipe being turnably mounted, a pointer fixed to the pipe outside the tank, and a graduated scale outside the tank over which the free end of the pointer is movable.

5. The combination with a tank having a main filter upon which the solid material accumulates, a pipe turnably mounted in the tank and projecting both inside and outside thereof, a supplemental filter and a float both connected to said pipe inside the tank turnable in unison with the pipe, said pipe adapted to communicate with the interior of the supplemental filter, upon which latter the solid material also accumulates, a pointer fixed to the pipe outside the filter, a weight adjustable upon the pointer, and a graduated scale outside the filter over which the free end of the pointer is movable.

6. The combination with a tank having a main filter upon which the solid material accumulates, a pipe turnably mounted in the tank and projecting both inside and outside thereof, a supplemental filter and a float both connected to said pipe inside the tank and turnable in unison with the pipe, said pipe adapted to communicate with the interior of the supplemental filter, upon which latter the solid material also accumulates, a pointer fixed to the pipe outside the filter, a weight adjustable upon the pointer, a graduated scale outside the filter over which the free end of the pointer is movable, and a continuation of the pipe through which the filtered liquid from the supplemental filter may be delivered.

7. A filter tank having a main filter upon which the solid material accumulates in cake form said tank containing a supplemental filter which is submerged in the fluid contents of the tank and is pivotally mounted so that it will sink into said contents as the solid matter thereof accumulates on said supplemental filter, a float connected to move with but in an opposite direction to said supplemental filter, and an indicating means outside the tank and movable in unison with the supplemental filter and adapted to indicate the thickness of the solid matter accumulated upon the supplemental filter.

In testimony whereof I affix my signature in presence of two witnesses.

DAVID J. KELLY.

Witnesses:
ALBERT L. GENTER.
C. B. FELT.